United States Patent [19]

Miyazaki et al.

[11] Patent Number: 4,960,827

[45] Date of Patent: Oct. 2, 1990

[54] CURABLE RESIN COMPOSITION

[75] Inventors: Nobuyuki Miyazaki; Takashi Takayanagi; Masashi Matsuo, all of Yokohama, Japan

[73] Assignee: Asahi Glass Company, Ltd., Tokyo, Japan

[21] Appl. No.: 180,588

[22] Filed: Apr. 7, 1988

Related U.S. Application Data

[63] Continuation of Ser. No. 813,001, Dec. 24, 1985, abandoned.

[30] Foreign Application Priority Data

Dec. 27, 1984 [JP] Japan ................. 59-273725

[51] Int. Cl.$^5$ .................. C08L 75/00; C08F 18/00
[52] U.S. Cl. .................... 525/131; 525/101; 525/107; 525/123
[58] Field of Search ............... 525/131, 186, 101, 123

[56] References Cited

U.S. PATENT DOCUMENTS

| | | | |
|---|---|---|---|
| 4,250,278 | 2/1981 | Suzuki et al. ................. | 525/326.3 |
| 4,281,092 | 7/1981 | Breazeale ....................... | 525/360 |
| 4,413,094 | 11/1983 | Aufdermarsh, Jr. ............ | 525/186 |
| 4,530,969 | 7/1985 | Moggi et al. .................. | 525/186 |
| 4,530,970 | 7/1985 | Morozumi et al. ............. | 525/199 |

FOREIGN PATENT DOCUMENTS 2424936  11/1979  France .
2081727  2/1982  United Kingdom .

*Primary Examiner*—Ana L. Carrillo
*Attorney, Agent, or Firm*—Oblon, Spivak, McClelland, Maier & Neustadt

[57] ABSTRACT

A curable resin composition comprising a fluoroolefin polymer containing at least 10% by weight of fluorine based on the fluoroolefin unit, being soluble in a solvent and having curable reactive sites, and a curing agent, wherein a polyfluorocarbon chain-containing compound having a functional group reactive with the fluoroolefin polymer and/or the curing agent, is incorporated said composition being useful for the formation of a coating film of excellent water and oil repellency, and stain-proof properties.

3 Claims, No Drawings

CURABLE RESIN COMPOSITION

This application is a Continuation of application Ser. No. 813,001, filed on Dec. 24, 1985, now abandoned.

The present invention relates to a curable resin composition. More particularly, it relates to a curable resin composition comprising a specific fluoroolefin polymer, a curing agent and a specific polyfluorocarbon chain-containing compound, which has excellent processability and is useful for the formation of a coating film capable of exhibiting excellent water and oil repellency, non-tackiness and stainproof properties for a long period of time.

A fluorine resin coating composition containing a solvent-soluble fluoroolefin polymer has been known as a composition capable of forming a coating film having excellent weatherability (see e.g. Japanese Unexamined Patent Publication No. 34107/1982). However, such a conventional fluorine resin coating composition is not necessarily satisfactory in the water and oil repellency or stain-resistance of the coating film. On the other hand, a perfluoroalkyl group-containing acrylate polymer or the like is known as a water and oil repellant or a stainproofing agent. However, such an acrylate polymer is inferior to the fluoroolefin polymer in respect of the transparency or pigment-dispersibility, or in the formation of a strong thick coating film, and is unsuitable as a coating film required to have weatherability for a long period of time.

It is disclosed e.g. in Japanese Unexamined Patent Publication No. 4528/1973 that a coating resin composition comprising a specific perfluoroalkyl group-containing polymer and a cross-linking component, is capable of forming a cured coating film having excellent stain resistance. Disclosed as the perfluoroalkyl group-containing polymer is a copolymer obtained by copolymerizing a monovinyl aromatic hydrocarbon to impart good solubility in a solvent for coating material, with a functional group-containing monomer reactive with the cross-linking component to form a cured coating film having a three dimensional network structure. This Japanese Unexamined Patent Publication No. 4528/1973 discloses a cured coating film composed mainly of the above-mentioned specific perfluoroalkyl group-containing polymer in a specific example. However, the coating film in which such a perfluoroalkyl group-containing polymer is used as the base material, belongs to the same category as the above-mentioned water and oil repellant or the stainproofing agent, and thus, it is inferior to the fluoroolefin polymer-based coating film because of the above-mentioned problems and unsatisfactory as a weatherable coating material.

On the other hand, for the purpose of improving the surface properties of a coating film, it has been proposed to incorporate various compounds or polymers containing perfluoroalkyl groups. For instance, it is proposed to improve the smoothness of coating films by incorporating a fluorine-containing urethane compound, a fluorinated acrylic resin or a fluorinated silicone to thermosetting resins in e.g. Japanese Unexamined Patent Publications No. 84824/1976, No. 8034/1977 and No. 47030/1977. However, in these coating films, the base material is commonly employed resins whereby certain difficulties are observed with respect to e.g. weatherability for a long period of time, and the additives are likely to be lost by e.g. bleeding out due to inadequate compatibility with the coating films, whereby it is difficult to maintain good surface properties of the coating films for a long period of time.

It is an object of the present invention to overcome the above-mentioned difficulties inherent to the prior art and to provide a curable resin composition capable of forming a coating film having excellent weatherability, having excellent processability and being useful for the formation of a coating film capable of exhibiting water and oil repellency, non-tackiness and stainproof properties for a long period of time.

According to the study by the present inventors, it is necessary to use a curable reactive fluoroolefin polymer as the base material in order to form a strong coating film having excellent weatherability, and it is advantageous to incorporate a perfluoroalkyl group-containing compound for the improvement of the surface properties such as the water and oil repellency and stainproof properties of the coating film. As a result of extensive researches and studies, the present inventors have found that a non-polymeric polyfluorocarbon chain-containing compound such as a fluorinated alcohol, glycol or a derivative thereof, is advantageous as a surface property improving agent for coating films in view of the compatibility with the base material of the coating film, and such a polyfluorocarbon chain-containing compound is capable of being reacted with and bonded to either one or both of the fluoroolefin polymer base material and the curing agent by virtue of a functional group such as a hydroxyl group thereof. Namely, by incorporating to a film-forming composition of a curable reactive fluoroolefin polymer base material a polyfluorocarbon chain-containing compound having a functional group reactive therewith, it is possible to obtain a curable resin composition useful for the formation of a weatherable coating film exhibiting excellent water and oil repellency, stainproof properties and non-tackiness over a long period of time. The present invention is based on these discoveries.

The present invention provides a curable resin composition comprising a fluoroolefin polymer containing at least 10% by weight of fluorine based on the fluoroolefin unit, being soluble in a solvent and having curable reactive sites, and a curing agent, wherein a polyfluorocarbon chain-containing compound having a functional group reactive with the fluoroolefin polymer and/or the curing agent, is incorporated.

In the present invention, it is important to use a fluoroolefin polymer containing at least 10% by weight of fluorine atoms based on the fluoroolefin unit and having good compatibility or solubility to the curing agent and a solvent commonly used for coating material. If the fluorine content is too small, the advantage as the base material for weatherable coating material decreases and the effects for the improvement in the processability of the composition tend to be poor. Not only that, such an inadequate fluorine content is undesirable also from the aspect of the cured coating film properties. Further, fluorine polymers insoluble in various solvents, such as a polytetrafluoroethylene, a tetrafluoroethylenehexafluoropropylene copolymer, a tetrafluoroethyleneperfluoro(alkyl vinyl ether) copolymer, a polychlorotrifluoroethylene, a tetrafluoroethylene-ethylene copolymer and a chlorotrifluoroethylene-ethylene copolymer, are not suitable even if they contain at least 10% by weight of fluorine atoms, since they are hardly compatible with the curing agent and the specific polyfluorocarbon chain-containing compound, whereby it will be difficult to accomplish the intertwining of molecular chains or the formation of a network structure. The fluorine content in the specific fluoroolefin polymer in the present invention is usually selected within a range of from 10 to 70% by weight, preferably from 15 to 50% by weight.

As the fluoroolefin polymer in the present invention, it is preferred to employ an addition polymer type from the viewpoint of the processability of the composition and the mechanical properties of the cured film. Further, from the viewpoint of the reactivity with the specific polyfluorocarbon chain-containing compound, those containing functional groups such as hydroxyl groups, epoxy groups, carboxyl groups, acid amide groups, ester groups, unsaturated bonds, other active hydrogen atoms or halogen atoms, are preferably employed.

In the present invention, typical examples of such suitable addition polymers include a polyvinylidene fluoride, a tetrafluoroethylene-propylene copolymer, a vinylidenefluoride-hexafluoropropylene-tetrafluoroethylene copolymer and a copolymer of a fluoroolefin such as tetrafluoroethylene or chlorotrifluoroethylene with an alkyl vinyl ether. Among them, the fluoroolefin-alkyl vinyl ether copolymer is preferably employed since it is an addition polymer having a high fluorine content and being soluble in a solvent.

The fluoroolefin-vinyl ether copolymer suitable for use in the present invention includes the one comprising from 30 to 70 mol % of fluoroolefin units and from 70 to 30 mol % of vinyl ether units and having a specific viscosity of from 0.05 to 2.0 dl/g as measured in an uncured state in tetrahydrofuran at 30° C. Preferred fluoroolefin components include tetrafluoroethylene and chlorotrifluoroethylene. Likewise, preferred vinyl ether components include alkyl vinyl ethers containing straight chained, branched or cyclic alkyl groups having from 2 to 8 carbon atoms. Further, as a comonomer presenting curable reactive sites in such a copolymer, it is preferred to employ a functional group-containing vinyl ether such as a hydroxy alkyl vinyl ether or a glycidyl vinyl ether.

The content of the curable reactive sites in the above-mentioned specific fluoroolefin polymer may optionally be changed. However, if the content is too small, the cross-linking reaction does not adequately proceed and the cross-linking density will be insufficient, whereby it will be difficult to obtain a strong coating film. On the other hand, if the content is excessive, the cross-linking density tends to be too great, the resulting coating film tends to be brittle, and the shrinkage stress resulting from the curing reaction tends to be great, whereby the adhesion to the substrate tends to be poor. Accordingly, the content of the functional group-containing vinyl ether is usually selected within a range of from 0.5 to 40 mol %, preferably from 1 to 30 mol %. Further, in the case where the functional group is a hydroxyl group, the content of the curable reactive sites maybe selected so that the hydroxyl value of the fluoroolefin polymer will be within the range of from 2 to 200, preferably from 5 to 150.

For the curing agent in the present invention, various curing agents may be used depending upon the curable reactive sites in the fluoroolefin polymer. For instance, in the case of a fluoroolefin polymer wherein the reactive sites are hydroxyl groups, various curing agents which are commonly employed for thermosetting acrylic coating materials, such as melamine, urea resin, polybasic acid, epoxy, silicone or block polyisocyanate curing agents, may effectively be used. It is, of course, possible to use a curing accelerator in addition to such a curing agent. Such a curing agent is employed in a suitable amount depending upon the content of the curable reactive sites in the specific fluoroolefin polymer, the proportion of the specific polyfluorocarbon chain-containing compound described hereinafter, the desired curing density in the cured film or the type of the curing agent. The amount is selected usually within a range of from 1 to 70 parts by weight, preferably from 2 to 55 parts by weight of the curing agent relative to 100 parts by weight of the specific fluoroolefin polymer.

In the present invention, it is important to incorporate a polyfluorocarbon chain-containing compound having a functional group reactive with the fluoroolefin polymer and/or the curing agent to the above-mentioned curable resin composition comprising the specific fluoroolefin polymer and the curing agent. As the polyfluorocarbon chain, a perfluoroalkyl group or a perfluoroalkylene group may be mentioned. It is usually preferred to employ a perfluoroalkyl group, because it is thereby possible to advantageously improve the water and oil repellency, stainproof properties and non-tackiness of the cured film. In the present invention, a compound containing a perfluoroalkyl group having from 1 to 20 carbon atoms is preferably employed. Particularly preferred is a compound containing a perfluoroalkyl group having from 3 to 15 carbon atoms. Of course, it is possible to employ a compound containing a perfluoroalkylene group having from 1 to 20 carbon atoms. As the functional group, any suitable group reactive with the specific fluoroolefin polymer and/or the curing agent may be employed, and the functional groups as mentioned for the curable reactive sites in the above-mentioned specific fluoroolefin polymer may be mentioned. Among them, a polyfluorocarbon chain-containing compound having a hydroxyl group as the functional group is preferably employed in the present invention.

Specific examples of the specific polyfluorocarbon chain-containing compound in the present invention include the following compounds: a perfluoroalkyl group-containing alcohol such as $CF_3(CF_2)_nCH_2CH_2OH$ (wherein n is 0 or an integer of from 1 to 19), a glycol such as $HOCH_2CH_2(CF_2)_mCH_2CH_2OH$ (wherein m is an integer of from 1 to 20) or $CF_3(CF_2)_nCON(CH_2CH_2OH)_2$ where n is as above. Further, there may be employed a polyfluoroalkyl group-containing carboxylic acid or carboxylic acid anhydride, an epoxy compound, an isocyanate compound, an amino compound, a melamine compound or a phenol compound.

In the present invention, the amount of the specific polyfluorocarbon chain-containing compound is optionally adjusted depending upon the predetermined purpose, and is usually selected within a range of from 0.1 to 100 parts by weight, preferably from 0.5 to 50 parts by weight of the polyfluorocarbon chain-containing compound relative to 100 parts by weight of the specific fluoroolefin polymer. If the amount of the polyfluorocarbon chain-containing compound is too small, the intended effects for the improvement of the surface properties of the cured coating film decreases, and if the amount is excessive, the effects of the incorporation will be saturated and tend to impair the properties of the cured coating film itself wherein the fluoroolefin polymer is used as the base material.

For the preparation of the curable resin composition of the present invention, various solvents may be employed including aromatic hydrocarbons such as xylene and toluene, alcohols such as n-butanol, esters such as butyl acetate, ketones such as methyl isobutyl ketone and glycol ethers such as ethyl cellosolve, as well as various commercially available thinners. Such preparation may be conducted by means of various machines commonly employed for the preparation of coating materials, such as a ball mill, a paint shaker, a sand mill, a jet mill, a three-roll mill and a kneader. During such preparation, a pigment, a dispersion stabilizer, a viscosity regulating agent, a leveling agent, an antigelation agent, an ultraviolet absorber, etc. may be added.

Further for the purpose of improving the distinctiveness, mechanical strength, adhesion, durability or the like, it is possible to optionally incorporate additives such as a pigment, a coloring agent, a filler or a stabilizer to the composition of the present invention. Typical examples of such additives include Phthalocyanine Green, titanium oxide, alumina, talc, calcium carbonate and silica.

For the formation of the coating film of the composition of the present invention, the three components i.e. the fluoroolefin polymer, the curing agent and the polyfluorocarbon chain-containing compound are mixed and dissolved usually by using a predetermined solvent, and then the mixture is coated. If necessary, the polyfluorocarbon chain-containing compound may firstly be reacted with the fluoroolefin polymer or the curing agent, followed by mixing and dissolving the remaining component, and the mixture thus obtained is coated.

The composition of the present invention imparts water and oil repellency, non-tackiness, stainproof properties, easy wiping properties and slip properties to a coating film of the fluoroolefin polymer having excellent weatherability, and thus provides various advantages in the coating fields for e.g. coating materials and fiber treating agents. Further, the composition of the present invention may be used as a modifier for various synthetic resins or synthetic rubbers, or as a binder for magnetic recording materials, by virtue of the above-mentioned excellent properties. Firstly, in the field of coating materials, it is possible to obtain coatings exhibiting excellent stain resistance for a long period of time, and thus the composition of the present invention is useful for coating the portions susceptible to stain, of e.g. office appliances, electric appliances and equipments, kitchen appliances, roof materials, road traffic signs, acoustic insulation walls, building exteriors and interiors, automobiles, transportation vehicles and chemical plant exterior walls. Further, the composition of the present invention is advantageously used as a fiber treating agent, whereby a thick coating is possible and it is possible to form a coating film which is strong and durable and has excellent water and oil repellency. Furthermore, the composition of the present invention is useful as a stain resistant coating film for various parts of electrophotographic appliances and equipments, as a moisture-proof coating material or modifier for toners or carriers, or as a lubricating coating layer, binder or modifier for magnetic recording media.

The curable resin composition of the present invention may be applied not only to a metal such as iron, aluminum, copper or an alloy thereof (e.g. stainless steel or brass) but also an inorganic material such as glass, cement or concrete and an organic material such as plastics including fiber reinforced plastics, polyethylene, polypropylene, an ethylene-vinyl acetate copolymer, nylon, an acrylic resin, a polyester, an ethylene-polyvinyl alcohol copolymer, polyvinyl chloride, polyvinylidene chloride and polycarbonate, rubber, wood and fiber, as well as various substrates having coating layers. Further, the shape of the substrate is not restricted to a flat plate, and the coating layer may readily be formed also on a substrate having a complicated shape. Further, the coating may be carried out at site and may be applied to a large structural object such as interior walls of a tunnel.

Now, the present invention will be described in detail with reference to Examples. However, it should be understood that the present invention is by no means restricted by such specific Examples.

In the following Examples and Comparative Examples, "parts" means "parts by weight" unless otherwise specified.

EXAMPLE 1

100 parts of a fluorine-containing four component copolymer comprising units derived from chlorotrifluoroethylene, cyclohexyl vinyl ether, ethyl vinyl ether and hydroxybutyl vinyl ether in a ratio of 50/10/30/10 (mol %) and having a specific viscosity of 0.30 dl/g as measured in tetrahydrofuran at 30° C., 3.5 parts of $CF_3(CF_2)_nCH_2CH_2OH$ (n=6–14, a mixture of alcohols having an average molecular weight of about 514), $7\times 10^{-4}$ part of dibutyltin dilaurate and 20 parts of polyisocyanate ("Colonate EH": tradename, manufactured by Nippon Polyurethane) were mixed and dissolved in 240 parts of methyl isobutyl ketone to obtain a coating composition.

The above composition was coated on an aluminum plate (thickness: 0.8 mm) subjected to chromate treatment, by means of an applicator, in an amount to bring the dried film thickness to about 25 $\mu$m, and cured at room temperature for 1 week. With respect to the coated aluminum plate thus obtained, various physical properties of the coating film were measured. The adhesion was tested by square cutting and tape tests. The solvent resistance of the coating film was tested by rubbing the coating film 200 times with a xylene-impregnated gauze and confirming that no peeling or no abnormality such as solubilization takes place. The water and oil repellency was evaluated by measuring the contact angle against water and nujol.

Further, the stain resistance was evaluated by a stainproofing test against a marker ink and carbon black.

The marker ink test was conducted by drawing a line on the surface of the coating film with a black marker, and the degree of repellency of the drawn line was examined. Then, the drawn line was gently wiped with an ethanol-impregnated gauze, and the degree of wiping off of the drawn line was examined.

The carbon black stain test was conducted by spraying a dispersion of 0.1% by weight of carbon black in distilled water on the surface of the coating film, followed by drying in a dryer of 60°C. for 20 minutes. This cycle was repeated 10 times, and then the coating film surface was washed with water, and the remaining amount of the carbon stain was examined. ( :no substantial stain observed, Δ: slightly blackish, X: substantially black).

Further, the smoothness was evaluated by measuring the dynamic frictional coefficient by a "Heidon" surface property tester (tradename, Shinto Kagaku K.K.).

The results of the above tests are shown in Table 1.

EXAMPLE 2

1.8 parts of $CF_3(CF_2)_nCH_2CH_2OH$ (n=6-14, a mixture of alcohols having an average molecular weight of 514), 19 parts of polyisocyanate ("Colonate EH": tradename, manufactured by Nippon Polyurethane) and $7\times10^{-4}$ part of dibutyltin dilaurate, were mixed and dissolved in 40 parts of methyl isobutyl ketone, and then reacted in a flask at 50° C. for 3 hours.

On the other hand, 100 parts of a four component copolymer comprising chlorotrifluoroethylene/ethyl vinyl ether/cyclohexyl vinyl ether/hydroxybutyl vinyl ether in a molar ratio of 50/20/10/20 was dissolved in 200 parts of xylene/methyl isobutyl ketone (weight ratio: 1/1), and the solution was mixed with 45 parts of titanium white ("CR-50": tradename, manufactured by Ishihara Sangyo Kaisha Ltd.). The mixture was thoroughly dispersed in a ball mill to obtain a white coating material. This coating material was mixed and dissolved in the abovementioned reaction product of the fluorinated alcohol with the polyisocyanate to obtain a coating composition.

The above composition was coated on the aluminum plate and cured in the same manner as in Example 1. After curing at room temperature for 1 week, the coated aluminum plate was subjected to coating film tests in the same manner as in Example 1. The results are shown in Table 1.

COMPARATIVE EXAMPLE 1

A coating composition was prepared in the same manner as in Example 1 except that the fluorinated alcohol $CF_3(CF_2)_nCH_2CH_2OH$ (n=6-14, a mixture of alcohols having an average molecular weight of 514) was not incorporated, and it was coated and tested for the coated film under same conditions as in Example 1. Results are shown in Table 1.

EXAMPLE 3

100 parts of a three component copolymer comprising tetrafluoroethylene/propylene/glycidyl vinyl ether in a molar ratio of 50/40/10 was dissolved in 300 parts of ethyl acetate, and then 80 parts of titanium white ("CR-50": tradename, manufactured by Ishihara Sangyo Kaisha Ltd.) was added thereto. The mixture was dispersed in a ball mill to a particle size of 10 μm or less. Further, 10 parts of m-phenylenediamine and 30 parts of $HOCH_2CH_2(CF_2)_6CH_2CH_2OH$ were added and mixed thereto to obtain a composition.

The composition thus obtained was coated on a zinc steel plate (polished with #240 sand paper) having a thickness of 0.3 mm by means of a film applicator and cured at 150° C. for 40 minutes to obtain a coated test piece having a coating film of a thickness of 20 μm. The test piece was subjected to coating film tests in the same manner as in Example 1. The results are shown in Table 1.

EXAMPLE 4

100 parts of a fluorine-containing three component copolymer comprising units derived from tetrafluoroethylene, ethyl vinyl ether and hydroxylbutyl vinyl ether in a ratio of 50/35/15 (mol %) and having a specific viscosity of 0.26 dl/g as measured in tetrahydrofuran at 30° C., 20 parts of $(CH_3O)_3SiCH_2CH_2(CF_2)_6CH_2CH_2Si(OCH_3)_3$ and 200 parts of a solvent composed of xylene/n-butyl alcohol (weight ratio: 1/1) were mixed to obtain a composition. This composition was coated on a glass plate (thickness: 2.5 mm) and cured at 210° C. for 1 hour, followed by coating film tests in the same manner as in Example 1. The results are shown in Table 1.

COMPARATIVE EXAMPLE 2

A composition was prepared in the same manner as in Example 4 except that the fluorosilane $(CH_3O)_3SiCH_2CH_2(CF_2)_6CH_2CH_2(OCH_3)_3$ was not incorporated, and it was coated and tested in the same manner as in Example 4. The results are shown in Table 1.

EXAMPLE 5

100 parts of a fluorine-containing four component copolymer comprising units derived from chlorotrifluoroethylene, n-butyl vinyl ether, ethyl vinyl ether and hydroxylbutyl vinyl ether in a ratio of 50/10/30/10 (mol %) and having a specific viscosity of 0.30 dl/g as measured in tetrahydrofuran at 30° C., 5 parts of $CF_3(CF_2)_nCON(C_2H_4OH)_2$ [n=6-14 in the $CF_3(CF_2)_n$ group, average molecular weight of the group: 470], 10 parts of a methylated melamine resin ("Cymel 303": tradename, manufactured by Mitsui Toatsu), 1 part of an acidic catalyst ("Catalyst 6000": tradename, manufactured by Mitsui Toatsu) and 300 parts of a solvent composed of xylene/n-butyl alcohol (weight ratio: 1/1) were mixed to obtain a composition. The composition was coated on a FRP flat plate (thickness: 1.1 mm) by spraying, and dried by baking at 130° C. for 40 minutes, followed by coating film tests in the same manner as in Example 1. The results are shown in Table 1.

TABLE 1

| | Incorporated fluorine compound | Adhesion (square/ cutting tape) | Xylol rubbing (200 times) | Contact angle | | | |
|---|---|---|---|---|---|---|---|
| | | | | Water | Nujol | n-Decane | n-Hexane |
| Example 1 | $CF_3(CF_2)_nCH_2CH_2OH$ | 100/100 | | 113 | 84 | 69 | 47 |
| Example 2 | $CF_3(CF_2)_nCH_2CH_2OH$ | 100/100 | | 112 | 83 | 75 | 48 |
| Comparative Example 1 | None | 100/100 | | 85 | <30 | — | — |
| Example 3 | $HOCH_2CH_2(CF_2)_6CH_2CH_2OH$ | 100/100 | | 98 | 40 | — | — |
| Example 4 | $(CH_3O)_3SiCH_2CH_2CF_2)_6CH_2CH_2Si(OCH_3)_3$ | 100/100 | | 100 | 43 | — | — |
| Comparative Example 2 | None | 90/100 | X | 95 | 37 | — | — |
| Example 5 | $CF_3(CF_2)_nCON(C_2H_4OH)_2$ | 100/100 | | 110 | 62 | — | — |

| | Marker ink test | | Stain resistance against carbon black | Dynamic frictional coefficient |
|---|---|---|---|---|
| | Writability | Wiping off | | |
| Example 1 | Repelling | | | 0.09 |
| Example 2 | Repelling | | | 0.07 |
| Comparative Example 1 | No repelling | X | X | 0.40 |
| Example 3 | Slightly repelling | Δ | | 0.15 |

TABLE 1-continued

| | | | | |
|---|---|---|---|---|
| Example 4 | Slightly repelling | Δ | Δ | 0.10 |
| Comparative Example 2 | No repelling | X | X | 0.46 |
| Example 5 | Repelling | | | 0.11 |

SYNTHETIC EXAMPLE 1

10 parts of a methylated melamine resin ("Cymel 303": tradename, manufactured by Mitsui Toatsu) was diluted with 5 parts of methyl isobutyl ketone, and a small amount of sulfuric acid was added to adjust the solution to a pH of not higher than 2. Then, a solution of 2.2 parts of a fluorinated alcohol $CF_3(CF_2)_nCH_2CH_2OH$ (n=6-14, a mixture of alcohols having an average molecular weight of 514) in 2 parts of acetone was added thereto and reacted under reduced pressure at 60° C. for 4 hours to obtain a fluorine-containing melamine resin solution (A).

SYNTHETIC EXAMPLE 2

10 parts of a fluorinated alcohol $CF_3(CF_2)_nCH_2CH_2OH$ (n=6-14, a mixture of alcohols having an average molecular weight of 514) was dissolved in 10 parts of methyl isobutyl ketone, and $1 \times 10^{-4}$ part of dibutyltin dilaurate and 5 parts of isophorone diisocyanate were added thereto. The mixture was reacted at 60° C. for 4 hours. Then, the reaction mixture was dropwise added to a solution of 15 parts of a methylated melamine resin ("Cymel 350": tradename, manufactured by Mitsui Toatsu) in 5 parts of methyl isobutyl ketone, and then $2 \times 10^{-3}$ part of dibutyltin dilaurate was added thereto. The mixture was reacted at 60° C. for 8 hours to obtain a fluorine-containing melamine resin solution (B).

Synthetic Example 3

10 parts of a fluorinated alcohol $CF_3(CF_2)_nCH_2CH_2OH$ (n=6-14, a mixture of alcohols having an average molecular weight of 514) was dissolved in 10 parts of methyl isobutyl ketone, and 5 parts of dimethyl silyl diisocyanate $(CH_3)_2Si(NCO)_2$ was added thereto. The mixture was reacted at room temperature for 20 minutes. Then, the reaction mixture was dropwise added to a solution of 15 parts of a methylated melamine resin ("Cymel 350": tradename, manufactured by Mitsui Toatsu) in 5 parts of methyl isobutyl ketone, and then $2 \times 10^{-3}$ part of dibutyltin dilaurate was added thereto. The mixture was reacted at 60° C. for 8 hours to obtain a fluorine-containing melamine resin solution (C).

EXAMPLE 6

100 parts of the fluorine-containing four component copolymer as used in Example 1, 11 parts of the fluorine-containing melamine resin solution (A) obtained in Synthetic Example 1, 1 part of an acidic catalyst ("Catalyst 6000": tradename, manufactured by Mitsui Toatsu) and 100 parts of a solvent composed of xylene/n-butylalcohol (weight ratio: 8/2) were mixed to obtain a composition.

The above composition was coated in the same manner as in Example 1 and heated and cured at a temperature of 180° C. for 30 minutes. With respect to the coating film thus obtained, coating film tests were conducted in the same manner as in Example 1. The results are shown in Table 2.

EXAMPLE 7

A composition was prepared in the same manner as in Example 6 except that 20 parts of the fluorine-containing melamine resin solution (B) obtained in Synthetic Example 2 was incorporated instead of the fluorine-containing melamine resin solution (A), and it was formed into a coating film and tested in the same manner as in Example 6. The results are shown in Table 2.

EXAMPLE 8

A composition was prepared in the same manner as in Example 6 except that 20 parts of the fluorine-containing melamine resin solution (C) obtained in Synthetic Example 3 was used instead of the fluorine-containing melamine resin solution (A), and it was formed into a coating film and tested in the same manner as in Example 6. The results are shown in Table 2.

TABLE 2

| | Adhesion (square cutting/ tape) | Xylol rubbing (200 times) | Contact angle | | | | Marker ink test | | Stain resistance against carbon black | Dynamic frictional coefficient |
|---|---|---|---|---|---|---|---|---|---|---|
| | | | Water | Nujol | n-Decane | n-Hexane | Writability | Wiping off | | |
| Example 6 | 100/100 | | 110 | 80 | 68 | 47 | Repelling | | | 0.09 |
| Example 7 | 100/100 | | 108 | 79 | 68 | 46 | Repelling | | | 0.09 |
| Example 8 | 100/100 | | 105 | 77 | 65 | 43 | Repelling | | | 0.10 |

As described in the foregoing, the curable resin composition of present invention has a feature that it has excellent processability and it is capable of forming a cured coating film having excellent weatherability lasting for a long period of time. By the incorporation of the specific polyfluorocarbon chain-containing compound, it is possible to form a cured coating film exhibiting water and oil repellency, non-tackiness and stain-proofing properties for a long period of time, without impairing the above properties.

We claim:

1. A curable resin composition comprising (1) a fluoroolefin-alkylvinylether copolymer containing at least 10% by weight of fluorine based on the fluoroolefin unit, and having curable reactive sites, (2) an isocyanate or melamine curing agent, and (3) a $C_3-C_{15}$ perfluorocarbon chain-containing compound which differs from (1) having a function group reactive with the curing agent, wherein the curable reactive sites of the fluoroolefin-alkylvinylether copolymer are hydroxy groups and the $C_3-C_{15}$ perfluorocarbon chain-containing compound which differs from (1) is an alcohol having a $C_3-C_{15}$ perfluoroalkyl group and a hydroxyl functional group.

2. A curable resin composition comprising (1) a fluoroolefin-alkyl vinyl ether copolymer containing at least 10% by weight of fluorine based on the fluoroolefin unit, soluble in a solvent and having curable reactive sites of hydroxy groups, (2) an isocyanate or melamine curing agent, and (3) an alcohol having a $C_3$–$C_{15}$ perfluoroalkyl group and a hydroxyl functional group reactive with the curing agent which differs from (1).

3. The curable resin composition according to claim 2, which comprises 100 parts by weight of the fluoroolefin-alkyl vinyl ether copolymer, from 1 to 70 parts by weight of the isocyanate or melamine curing agent, and from 0.1 to 100 parts by weight of the alcohol.

* * * * *